US011453368B1

(12) United States Patent
Chang et al.

(10) Patent No.: US 11,453,368 B1
(45) Date of Patent: Sep. 27, 2022

(54) MULTI-SECTION WINDSHIELD WIPER

(71) Applicant: Danyang UPC Auto Parts Co., Ltd., Jiangsu (CN)

(72) Inventors: Che-Wei Chang, Jiangsu (CN); Cheng-Kai Yang, Jiangsu (CN)

(73) Assignee: DANYANG UPC AUTO PARTS CO., LTD., Jiangsu (CN)

( * ) Notice: Subject to any disclaimer, the term of this patent is extended or adjusted under 35 U.S.C. 154(b) by 0 days.

(21) Appl. No.: 17/373,748

(22) Filed: Jul. 12, 2021

(51) Int. Cl.
*B60S 1/38* (2006.01)
*F16B 21/07* (2006.01)
*F16B 5/06* (2006.01)

(52) U.S. Cl.
CPC ..... *B60S 1/3801* (2013.01); *B60S 2001/3813* (2013.01); *B60S 2001/3815* (2013.01); *F16B 5/0621* (2013.01); *F16B 21/07* (2013.01)

(58) Field of Classification Search
CPC .. B60S 1/38; B60S 1/3801; B60S 2001/3813; B60S 2001/3815; F16B 5/0621; F16B 5/0642; F16B 21/06; F16B 21/07; Y10T 403/18
USPC ...... 15/250.44, 250.26, 250.361; 403/24, 52, 403/164, 163
See application file for complete search history.

(56) References Cited

U.S. PATENT DOCUMENTS

| 3,408,679 | A | * | 11/1968 | Deutscher | B60S 1/3801 15/250.32 |
| 3,733,643 | A | * | 5/1973 | Arman | B60S 1/3801 15/250.46 |
| 4,103,386 | A | * | 8/1978 | Arndt | B60S 1/3801 15/250.46 |
| 4,896,987 | A | * | 1/1990 | Pethers | B60S 1/3801 15/250.46 |
| 8,261,405 | B2 | * | 9/2012 | Kim | B60S 1/3801 15/250.44 |
| 9,009,910 | B2 | * | 4/2015 | Yang | B60S 1/3801 15/250.361 |
| 10,189,445 | B2 | * | 1/2019 | Tolentino | B60S 1/3806 |
| 2013/0227810 | A1 | * | 9/2013 | Tolentino | B60S 1/4003 15/250.32 |

FOREIGN PATENT DOCUMENTS

EP 0240357 * 10/1987

* cited by examiner

*Primary Examiner* — Gary K. Graham
(74) *Attorney, Agent, or Firm* — Chun-Ming Shih; HDLS IPR Services

(57) ABSTRACT

The present disclosure relates to a windshield wiper. A fastening rack has a fastening seat and lateral fins. The elastic arms are disposed on the lateral fins and have a plurality of openings. The pressing sets are combined with the elastic arms, each pressing set has a pressing sheet and a buckling set, the pressing sheet is formed with an opening slot, the buckling set has a fastening bolt seat and an inserting member, the fastening bolt seat penetrates the opening and the opening slot, the inserting member penetrates the fastening bolt seat, the fastening bolt seat and the inserting member are mutually buckled to clamp the elastic arm and the pressing sheet. Thus, the pressing sheet is combined with the elastic arm and prevented from being loosened.

10 Claims, 7 Drawing Sheets

MULTI-SECTION WINDSHIELD WIPER

BACKGROUND

Technical Field

The present disclosure relates to a windshield wiper structure, especially to a multi-section windshield wiper with an assembling structure.

Description of Related Art

A related-art windshield wiper structure is to have a scrapping strip being disposed at a bottom end of a fastening rack, and a vehicle driving arm is utilized to drive the fastening rack, so that the scrapping strip may be pressed for achieving a glass cleaning effect.

The design of the windshield wiper requires the scrapping strip to be tightly and firmly adjacent to a glass of a vehicle for allowing an effect of ensuring rainwaters being removed to be achieved. Accordingly, a multi-section windshield wiper is designed in the related art, a plurality sets of supports are disposed at a bottom end of a fastening rack for processing a multi-section pressing process to an elastic sheet, so that a scrapping strip disposed at a bottom end of the elastic sheet may be pressed evenly so as to be more adjacent to the glass, thereby achieving an objective of ensuring the glass being cleaned.

However, the plurality sets of supporters of the aforesaid windshield wiper structure are combined with the fastening rack with a pivotally connecting or rotatably buckling means. The pivotally connecting means is complicated and time consuming, thus the production cost is increased. The rotatably buckling means may cause a situation of loosening during a swinging process, thus the operation thereof is inconvenient.

Accordingly, the applicant of the present disclosure has devoted himself for improving the mentioned disadvantages.

SUMMARY OF THE PRESENT DISCLOSURE

The present disclosure is to provide a multi-section windshield wiper, in which a pressing sheet may be rapidly combined with an elastic arm via the buckling set, thereby increasing conveniences in assembly.

The present disclosure is to provide a multi-section windshield wiper, in which a pressing sheet may be stably combined on the elastic arm due to an excellent latching and positioning effect achieved between a fastening bolt seat and an inserting member of a buckling set, thereby increasing an operating stability.

Accordingly, the present disclosure is to provide a multi-section windshield wiper including a fastening rack, a pair of elastic arms, a plurality of pressing sets and a scrapping strip. The fastening rack has a fastening seat and a pair of lateral fins connected to opposite sides of the fastening seat. The pair of elastic arms are disposed on the pair of lateral fins, and each of the elastic arms has a plurality of openings. The plurality of pressing sets are arranged corresponding to the openings and combined with the pair of elastic arms, each of the pressing sets has a pressing sheet and a buckling set, the pressing sheet is formed with an opening slot corresponding to each of the openings, the buckling set has a fastening bolt seat and an inserting member disposed in the fastening bolt seat, the fastening bolt seat penetrates the opening and the opening slot from one side of the elastic arm, the inserting member penetrates the fastening bolt seat from one side of the pressing sheet, the fastening bolt seat and the inserting member are mutually buckled to clamp the elastic arm and the pressing sheet, thus the pressing sheet is combined with the elastic arm and prevented from being loosened.

The multi-section windshield wiper provided by the present disclosure further includes a plurality of pressing strips capable of assisting and reinforcing a pressing force applied by the pressing sheet to the scrapping strip, so that the pressing force applied to the scrapping strip may be more uniform, and an objective of ensuring a cleaning effect may be achieved.

In comparison with related art, the present disclosure has advantageous features as follows. According to the multi-section windshield wiper provided by the present disclosure, the pressing sheet may be rapidly combined with the elastic arm via the buckling sets. Moreover, the pressing sheet may be stably combined on the elastic arm and preventing from being loosened due to the latching and positioning effect achieved between the fastening bolt seat and the inserting member of the buckling set, so that an objective of enabling the pressing sheet and the elastic arm to be rapidly combined, and advantages of increasing the convenience in assembling and the practicability in operation may be achieved.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
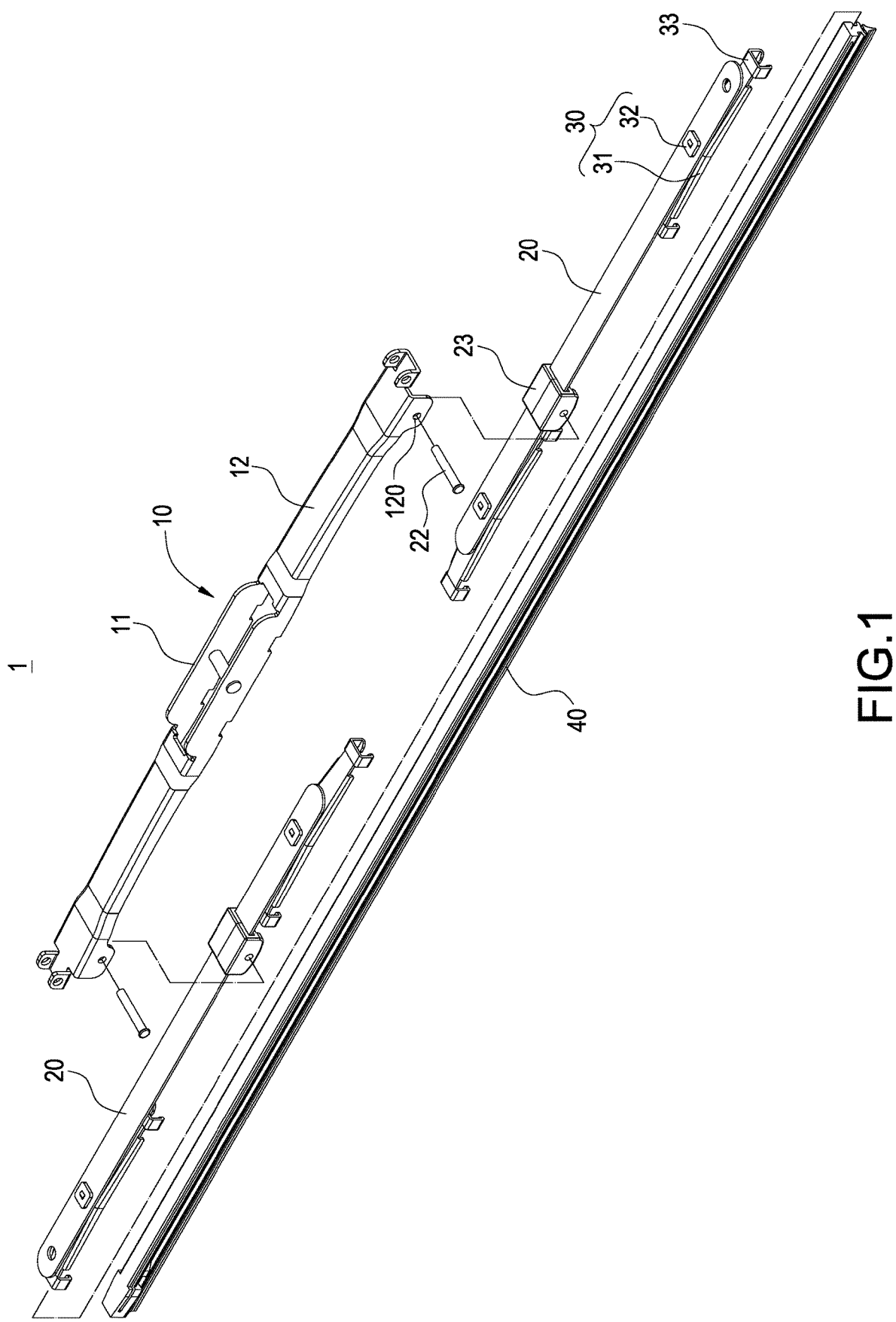
FIG. 1 is a perspective exploded view showing a multi-section windshield wiper according to the present disclosure.
Figure 2:
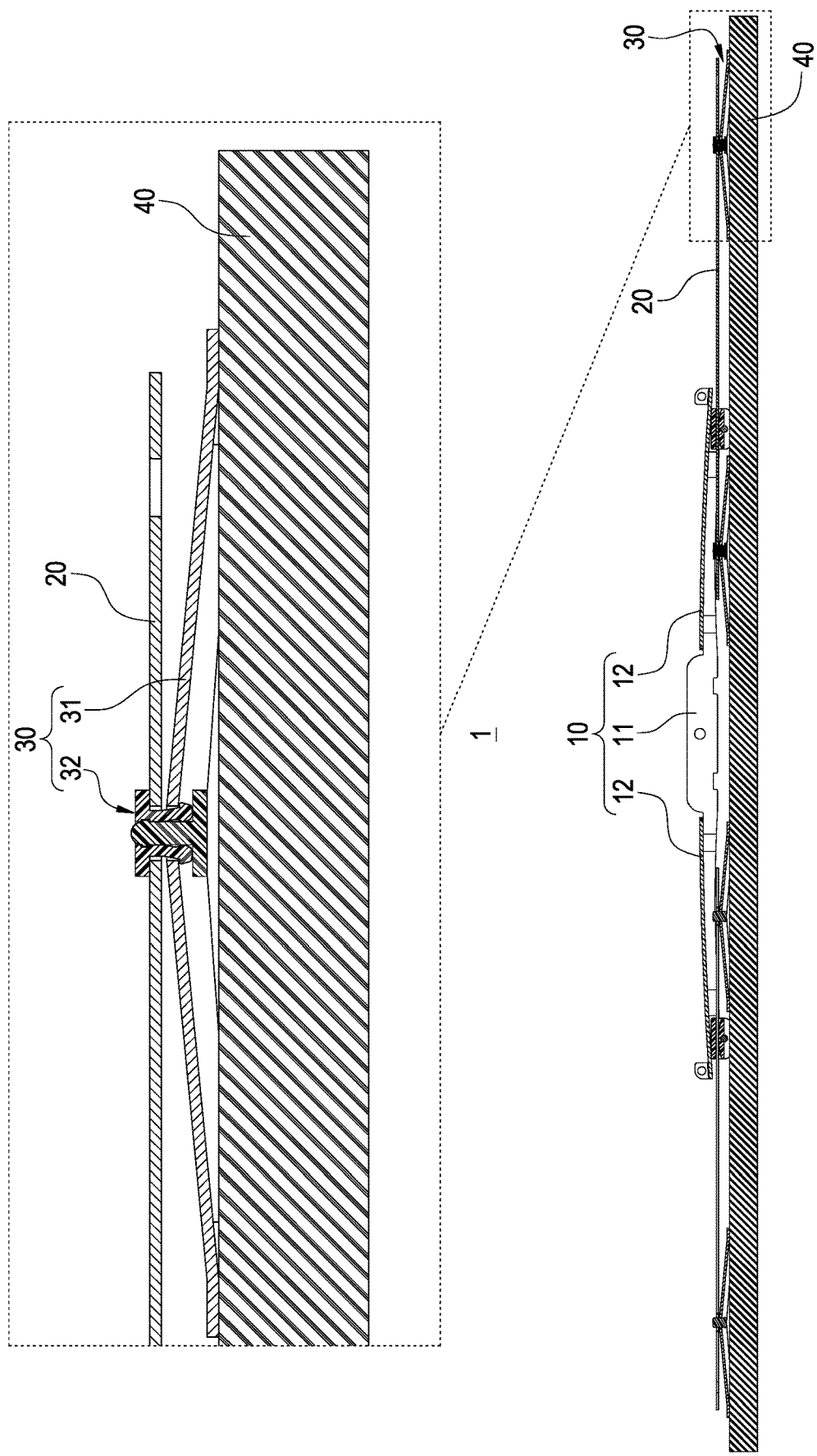
FIG. 2 is a cross sectional view showing the assembly of the multi-section windshield wiper according to the present disclosure.

Please refer to FIG. 1 and FIG. 2, wherein FIG. 1 is a perspective exploded view showing a multi-section windshield wiper with an assembling structure according to the present disclosure; and FIG. 2 is a cross sectional view showing the assembly of the multi-section windshield wiper according to the present disclosure. The present disclosure provides a multi-section windshield wiper 1 including a fastening rack 10, a pair of elastic arms 20, a plurality of pressing sets 30 and a scraping strip 40. The pair of elastic arms 20 are disposed on the fastening rack 10. The plurality of pressing sets 30 are symmetrically arranged on the pair of elastic arms 20 for the scraping strip 40 to be combined, thereby assembling the multi-section windshield wiper 1.

The fastening rack 10 has a fastening seat 11 and a pair of lateral fins 12 connected to opposite sides of the fastening seat 11. The pair of elastic arms 20 are respectively combined on the pair of lateral fins 12.

Moreover, the multi-section windshield wiper 1 further includes a pair of pivotal shafts 22 and a pair of pivotal connecting seats 23. Each of the lateral fins 12 has a pivotal connecting hole 120. Each of the pivotal connecting seats 23 is disposed on each of the elastic arms 20. The pair of the elastic arms 20 are pivotally connected to the pair of lateral fins 12 through the pair of pivotal shafts 22 being disposed in the pivotal connecting seat 23 and the pivotal connecting hole 120.

The plurality of pressing sets 30 are arranged corresponding to openings 21 to be combined with the pair of elastic arms 20. The scraping strip 40 is disposed at a bottom end of each pressing sheet 31 of the plurality of pressing sets 30. Accordingly, the pressing sets 30 press the scrapping strip 40 in a multi-section manner, so that the scrapping strip 40 may be tightly and firmly pressed on a glass surface so as to scrap rainwaters and foreign objects on the glass.

In some embodiments, the pressing set 30 of the multi-section windshield wiper 1 further has a plurality of frame sheets 33. The plurality of frame sheets 33 are combined with the pressing sheet 31 for the scraping strip 40 to be inserted.

Figure 3:
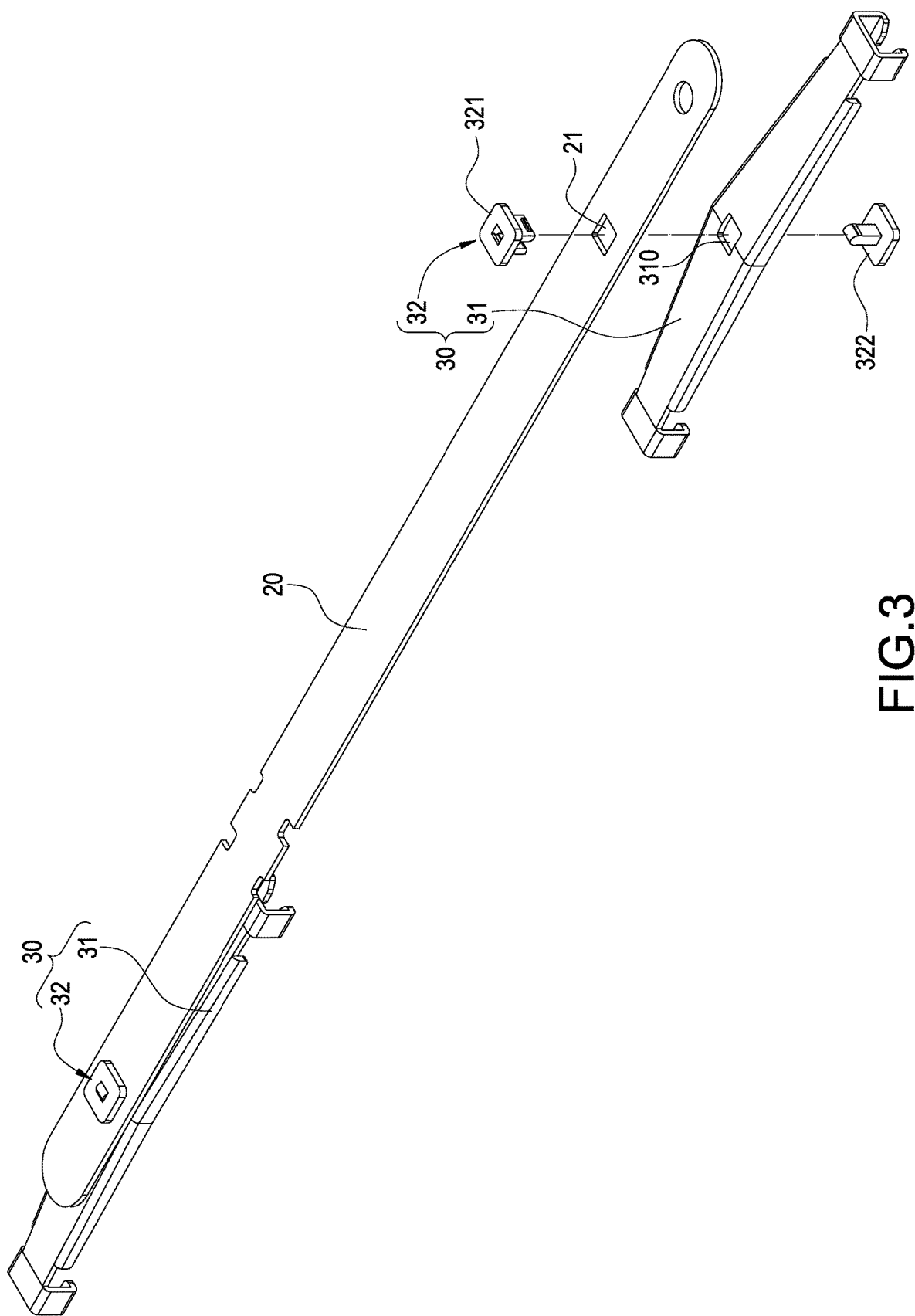
FIG. 3 is a perspective view showing the elastic arm being combined with the pressing set according to the present disclosure.
Figure 4:
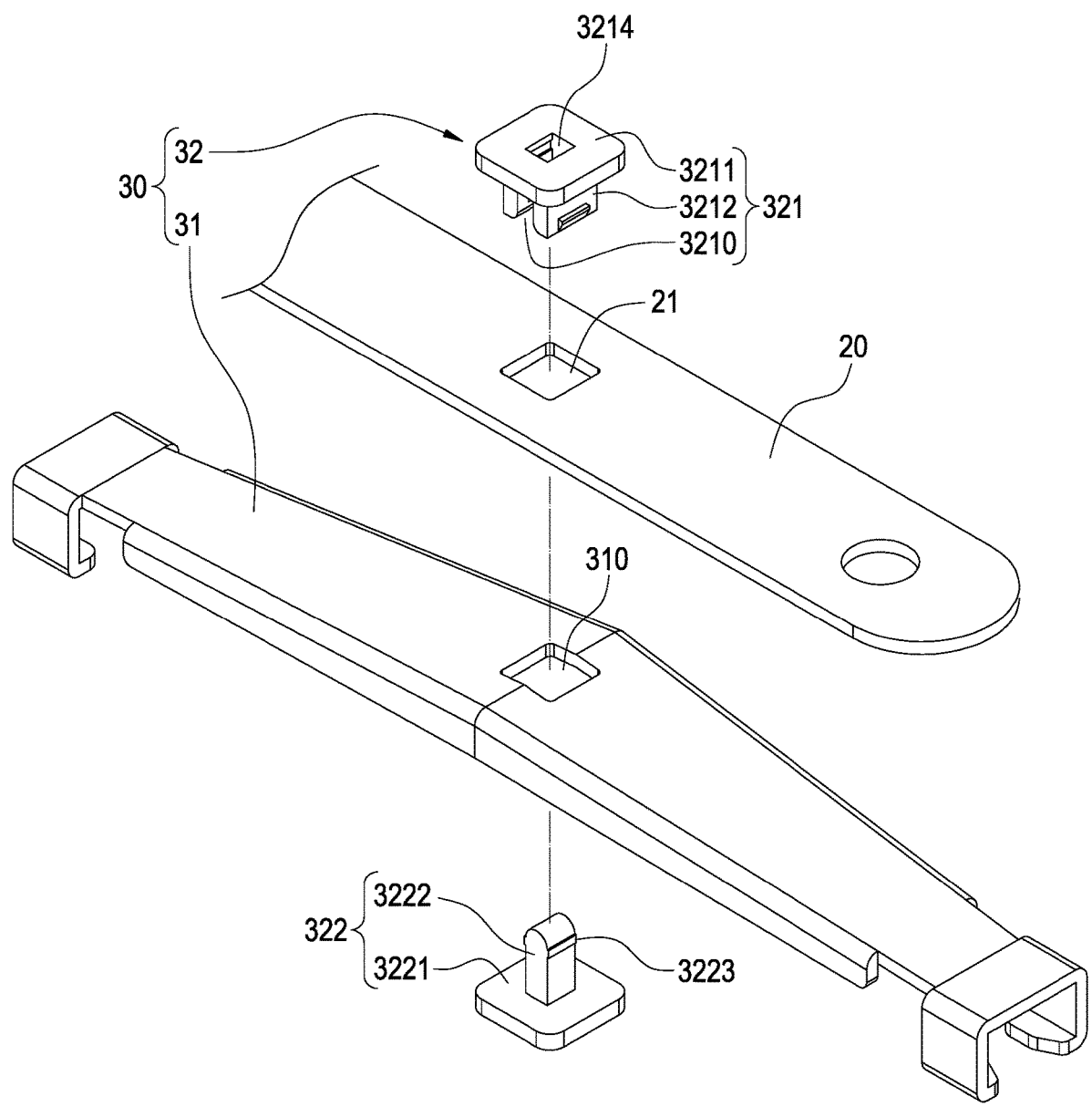
FIG. 4 is a perspective exploded view showing the elastic arm and the pressing set according to the present disclosure.
Figure 5:
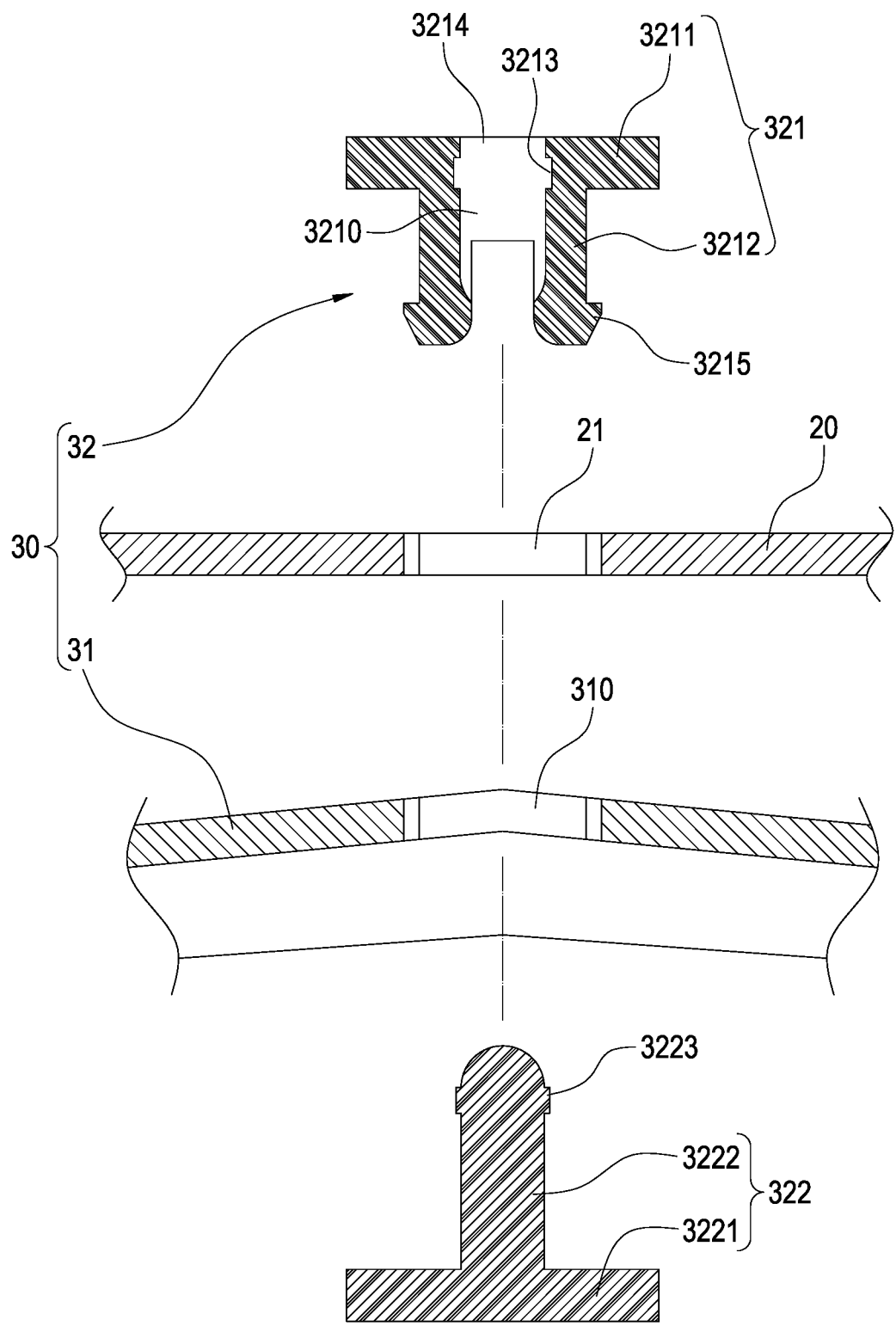
FIG. 5 is a planar cross sectional exploded view showing the elastic arm and the pressing set according to the present disclosure.
Figure 6:
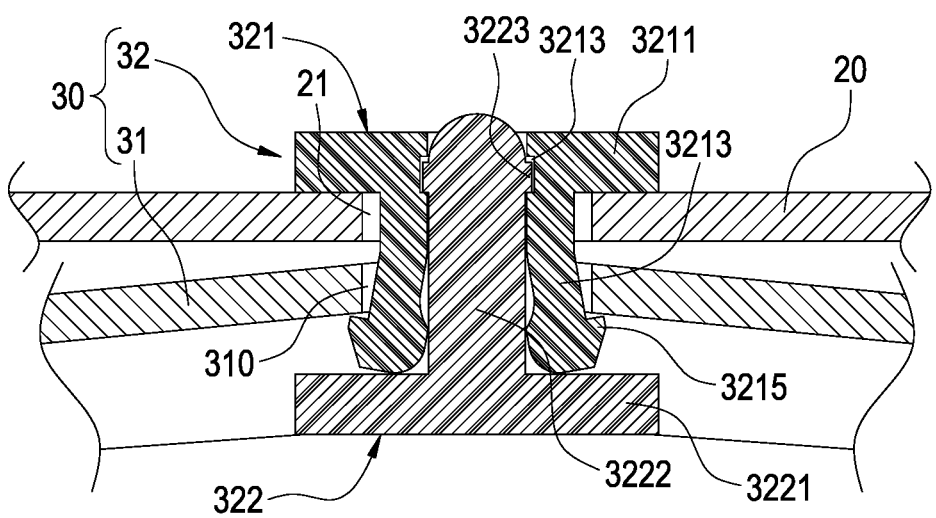
FIG. 6 is a cross sectional view showing the assembly of the elastic arm and the pressing set according to the present disclosure.

Please refer from FIG. 3 to FIG. 6, wherein FIG. 3 is a perspective view showing the elastic arm being combined with the pressing set according to the present disclosure; FIG. 4 is a perspective exploded view showing the elastic arm and the pressing set according to the present disclosure; FIG. 5 is a planar cross sectional exploded view showing the elastic arm and the pressing set according to the present disclosure; and FIG. 6 is a cross sectional view showing the assembly of the elastic arm and the pressing set according to the present disclosure.

In some embodiments, each of the elastic arms 20 has the plurality of openings 21. Each of the pressing sets 30 has the pressing sheet 31 and a buckling set 32. The pressing sheet 31 is formed with an opening slot 310 corresponding to each of the openings 21.

Moreover, the buckling set 32 has a fastening bolt seat 321 and an inserting member 322 disposed in the fastening bolt seat 321. The fastening bolt seat 321 penetrates the openings 21 and the opening slots 310 from one side of the elastic arm 20. The inserting member 322 penetrates the fastening bolt seat 321 from one side of the pressing sheet 31. Accordingly, the fastening bolt seat 321 and the inserting member 322 are mutually buckled to clamp the elastic arm 20 and the pressing sheet 31, thus the pressing sheet 31 may be combined with the elastic arm 20 and prevented from being loosened.

Specifically, the fastening bolt seat 321 has a bolt cover 3211, two clipping sheets 3212 connected to the bolt cover 3211 and a fastening space 3210 located between the two clipping sheets 3212. The inserting member 322 has a cap cover 3221 and an inserting rod 3222 connected to the cap cover 3221. The inserting rod 3222 is disposed in the fastening space 3210, and distal ends of the two clipping sheets 3212 abut against the cap cover 3221.

In some embodiments, the fastening bolt seat 321 has a concave slot 3213 formed on inner wall surfaces of the two clipping sheets 3212. Moreover, the inserting member 322 has a protrusion 3223 formed at an outer circumferential surface of the inserting rod 3222. Accordingly, the inserting member 322 and the fastening bolt seat 321 may be mutually positioned and combined through the protrusion 3223 and the concave slot 3213, and the inserting member 322 may be elastically clipped and fastened via the two clipping sheets 3212.

Specifically, the bolt cover 3211 has a hole 3214 communicating with the fastening space 3210, the concave slot 3213 is disposed on an inner wall surface of the hole 3214. Moreover, each of the clipping sheets 3212 has a latching hook 3215. The elastic arm 20 and the pressing sheet 31 are clamped between the latching hook 3215 and the bolt cover 3211.

Accordingly, the pressing sheets 31 may be rapidly combined with the elastic arm 20 via the buckling sets 32. Moreover, the inserting member 322 may be prevented from being released from the fastening bolt seat 321 due to the latching and positioning effect achieved between the fastening bolt seat 321 and the inserting member 322, so that the pressing sheet 31 may be stably combined on the elastic arm 20, thereby increasing an operating stability.

Figure 7:
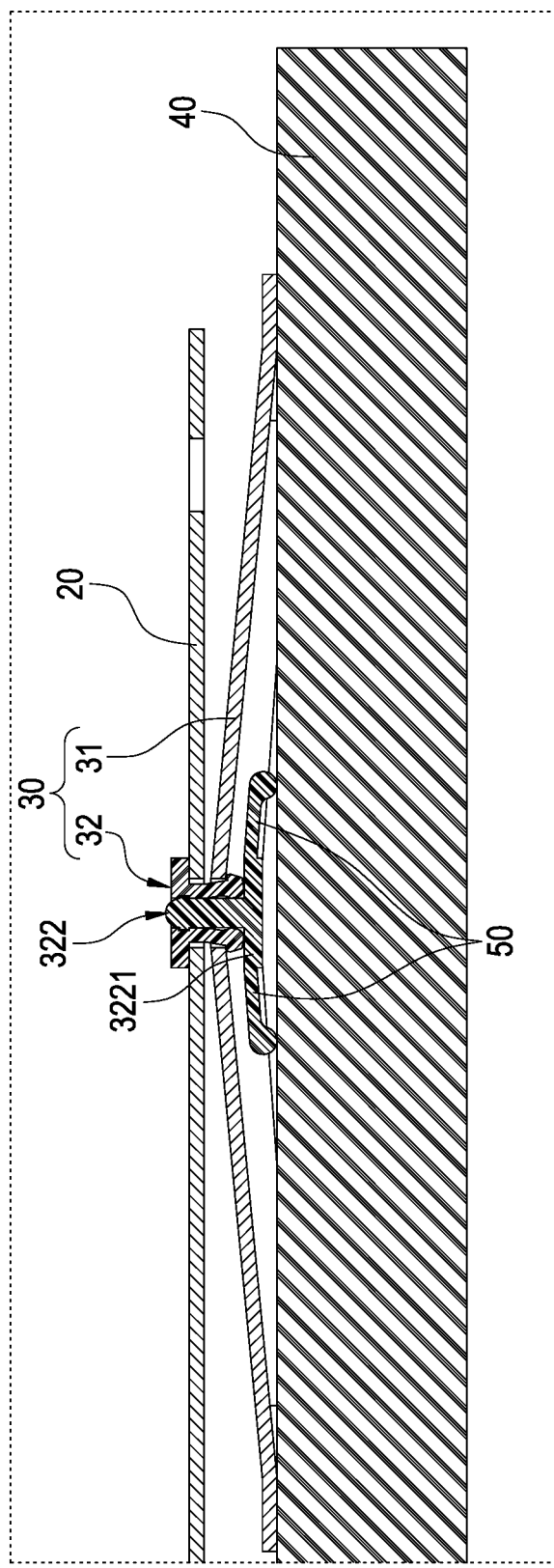
FIG. 7 is a schematic view showing the buckling set being extended with the pressing strip according to some embodiments of the present disclosure.

Please refer to FIG. 7, which is schematic view showing the buckling set being extended with the pressing strip according to some embodiments of the present disclosure. The multi-section windshield wiper 1 of the present disclosure further includes a plurality of pressing strips 50, the installation of the pressing strips 50 is to assist and reinforce a pressing force applied by the pressing sheets 31 to the scrapping strip 40, so that the pressing force applied to the scrapping strip 40 may be more uniform, and an objective of ensuring a cleaning effect may be achieved.

The pressing strips 50 are disposed between the fastening seat 11 and the scrapping strip 40 and press the scrapping strip 40 to attach a glass surface (not shown in figures) in a direction away from the fastening seat 11. Specifically, the pressing strips 50 are disposed on the inserting member 322 and extended between the pressing sheet 31 and the scrapping strip 40. In some embodiments, the pressing strips 50 are outwardly extended from a periphery of the cap cover 3211 of the inserting member 322. Accordingly, the pressing strips 50 are able to assist the pressing sheet 31 to press the scrapping strip 40, thereby achieving a more even pressing effect.

While this disclosure has been described by means of specific embodiments, numerous modifications and variations could be made thereto by those skilled in the art without departing from the scope and spirit of this disclosure set forth in the claims.

What is claimed is:

1. A multi-section windshield wiper, comprising:
    a fastening rack, comprising a fastening seat and a pair of lateral fins connected to opposite sides of the fastening seat;
    a pair of elastic arms, combined with the pair of lateral fins, each of the elastic arms comprising a plurality of openings;
    a plurality of pressing sets, arranged corresponding to the openings and combined with the pair of elastic arms, each of the pressing sets comprising a pressing sheet and a buckling set, an opening slot disposed on the pressing sheet corresponding to each of the openings, the buckling set comprising a fastening bolt seat and an inserting member disposed in the fastening bolt seat, the fastening bolt seat penetrating the opening and the opening slot from one side of the elastic arm, the inserting member penetrating the fastening bolt seat from one side of the pressing sheet, the fastening bolt seat and the inserting member buckled with each other to clamp the elastic arm and the pressing sheet, the pressing sheet being combined with the elastic arm; and a scrapping strip, disposed on a bottom end of the pressing sheet of each of the pressing sets.

2. The multi-section windshield wiper in claim 1, further comprising: a pair of pivotal shafts and a pair of pivotal connecting seats, each of the lateral fins comprising a pivotal connecting hole, the pivotal connecting seats disposed on the elastic arms, respectively, the pair of the elastic arms pivotally connected to the pair of the lateral fins, respectively, through a respective pivotal shaft being inserted in a respective pivotal connecting seat and a respective pivotal connecting hole.

3. The multi-section windshield wiper in claim 1, wherein each fastening bolt seat comprises a bolt cover, two clipping sheets connected to the bolt cover and a fastening space located between the two clipping sheets, each inserting member comprises a cap cover and an inserting rod connected to the cap cover, the inserting rod is inserted in the fastening space, and distal ends of the two clipping sheets abut against the cap cover.

4. The multi-section windshield wiper in claim 3, wherein each fastening bolt seat, which comprises a concave slot disposed on inner wall surfaces of the two clipping sheets, and each inserting member, which comprises a protrusion disposed on an outer circumferential surface of the inserting rod, are positioned with each other to be combined through the protrusion and the concave slot.

5. The multi-section windshield wiper in claim 4, wherein each bolt cover comprises a hole communicating with the fastening space, and a respective concave slot is disposed on an inner wall surface of the hole.

6. The multi-section windshield wiper in claim 3, wherein each of the clipping sheets comprises a latching hook, and a respective elastic arm and a respective pressing sheet are clamped between the latching hook and a respective bolt cover.

7. The multi-section windshield wiper in claim 3, furthering comprising: a plurality of pressing strips, disposed between a respective fastening seat and the scrapping strip and pressing the scrapping strip to attach on a glass surface in a direction away from the respective fastening seat.

8. The multi-section windshield wiper in claim 7, wherein each pressing strip is disposed on a respective inserting member and extended between a respective pressing sheet and the scrapping strip.

9. The multi-section windshield wiper in claim 8, wherein each pressing strip is outwardly extended from a periphery of a respective cap cover.

10. The multi-section windshield wiper in claim 1, wherein each of the pressing sets further comprises a plurality of frame sheets, combined with a respective pressing sheet to be inserted by the scrapping strip.

* * * * *